(12) United States Patent
Tanaka et al.

(10) Patent No.: US 11,242,963 B2
(45) Date of Patent: Feb. 8, 2022

(54) LIGHT SOURCE DEVICE AND ELECTRONIC APPARATUS

(71) Applicant: SONY CORPORATION, Tokyo (JP)

(72) Inventors: Masa Tanaka, Kanagawa (JP); Shinichiro Tajiri, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 676 days.

(21) Appl. No.: 16/087,343

(22) PCT Filed: Feb. 13, 2017

(86) PCT No.: PCT/JP2017/005071
§ 371 (c)(1),
(2) Date: Sep. 21, 2018

(87) PCT Pub. No.: WO2017/169187
PCT Pub. Date: Oct. 5, 2017

(65) Prior Publication Data
US 2021/0208491 A1    Jul. 8, 2021

(30) Foreign Application Priority Data

Mar. 31, 2016 (JP) .............................. JP2016-069940

(51) Int. Cl.
*F21S 2/00* (2016.01)
*G03B 21/20* (2006.01)

(52) U.S. Cl.
CPC .............. *F21S 2/00* (2013.01); *G03B 21/204* (2013.01)

(58) Field of Classification Search
None
See application file for complete search history.

(56) References Cited

U.S. PATENT DOCUMENTS

| 2012/0106126 A1* | 5/2012 | Nojima ................. G03B 33/08 |
| | | 362/84 |
| 2014/0168942 A1 | 6/2014 | Kishimoto et al. |
| 2016/0102819 A1 | 4/2016 | Misawa et al. |

FOREIGN PATENT DOCUMENTS

| CN | 105190163 A | 12/2015 |
| JP | 2012-083695 A | 4/2012 |
| JP | 2013-030720 A | 2/2013 |
| JP | 2014-134808 A | 7/2014 |
| JP | 2015-065142 A | 4/2015 |
| JP | 2015-121586 A | 7/2015 |
| JP | 2015-203857 A | 11/2015 |

(Continued)

OTHER PUBLICATIONS

International Search Report and Written Opinion of PCT Application No. PCT/JP2017/005071, dated May 9, 2017, 09 pages of translation and 08 pages of ISRWO.

(Continued)

*Primary Examiner* — Vip Patel
(74) *Attorney, Agent, or Firm* — Chip Law Group (57) ABSTRACT

A light source device includes a wavelength conversion element including a substrate and a wavelength conversion layer that is retained by the substrate. The wavelength conversion layer absorbs a portion of incident first color light to output second color light in a wavelength range different from the first color light while outputting an unabsorbed portion of the first color light, in which a portion of the substrate and the wavelength conversion layer has a function of diffusing the first color light.

11 Claims, 7 Drawing Sheets

(56) References Cited

FOREIGN PATENT DOCUMENTS

| JP | 2016-018010 A | 2/2016 |
| WO | 2013/018494 A1 | 2/2013 |
| WO | 2014/174618 A1 | 10/2014 |

OTHER PUBLICATIONS

International Preliminary Report on Patentability of PCT Application No. PCT/JP2017/005071, dated Oct. 11, 2018, 09 pages of English Translation and 06 pages of IPRP.

\* cited by examiner

| DIFFUSION ANGLE | ANGLE DISTRIBUTION MATCH RATE WITH FLUORESCENCE | TRANSMITTANCE | |
|---|---|---|---|
| 10° | 20% | 90% OR HIGHER | |
| 20° | 35% | 90% | A |
| 30° | 60% | — | |
| 40° | 70% | — | |
| 50° | 76% | — | |
| 60° | 90% | — | B |
| 70° | 94% | — | |
| 80° | 94% | 85% | |

[ FIG. 6A ]

| DIFFUSION ANGLE OF DIFFUSION PLATE [°] | B LIGHT DIVERGENCE ANGLE (FWHM) [°] |
|---|---|
| 10 | 10.5882 |
| 20 | 21.1765 |
| 30 | 35.2941 |
| 40 | 42.3529 |
| 50 | 49.4118 |
| 60 | 52.9412 |
| 70 | 56.4706 |
| 80 | 56.4706 |
| LAMBERTIAN | 60 |

LIGHT SOURCE DEVICE AND ELECTRONIC APPARATUS

CROSS REFERENCE TO RELATED APPLICATIONS

This application is a U.S. National Phase of International Patent Application No. PCT/JP2017/005071 filed on Feb. 13, 2017, which claims priority benefit of Japanese Patent Application No. JP 2016-069940 filed in the Japan Patent Office on Mar. 31, 2016. Each of the above-referenced applications is hereby incorporated herein by reference in its entirety.

TECHNICAL FIELD

The present disclosure relates to a light source device and an electronic equipment that employ a wavelength conversion element.

BACKGROUND ART

Recently, for an electronic apparatus such as a projector (projection-type display device), there is proposed a light source device using a phosphor wheel that absorbs light (excitation light) outputted from a light source for excitation to cause fluorescence emission (PTLs 1 and 2).

CITATION LIST

Patent Literature

PTL 1: Japanese Unexamined Patent Application Publication No. 2014-134808
PTL 2: Japanese Unexamined Patent Application Publication No. 2015-203857

SUMMARY OF THE INVENTION

Such a light source device as described above uses a combination of excitation light and fluorescence as illumination light. It is desired for such illumination light to have properties to suppress occurrence of color unevenness on an irradiated surface.

It is therefore desirable to provide a light source device that allows for generation of illumination light that causes little color unevenness on an irradiated surface, and an electronic apparatus that employs such a light source device.

A light source device according to an embodiment of the present disclosure includes a wavelength conversion element including a substrate, and a wavelength conversion layer that is retained by the substrate, and absorbs a portion of incident first color light to output second color light in a wavelength range different from the first color light while outputting an unabsorbed portion of the first color light, in which a portion of the substrate and the wavelength conversion layer has a function of diffusing the first color light.

An electronic apparatus according to an embodiment of the present disclosure includes the above-described light source device according to the embodiment of the present disclosure.

In the light source device and the electronic apparatus according to the embodiments of the present disclosure, the portion of the first color light is converted into the second color light by the wavelength conversion element to be outputted, and the unabsorbed portion is outputted without being subjected to wavelength conversion. That is, the light outputted from the wavelength conversion element includes the first color light and the second color light, and illumination light is outputted on the basis of the outputted light. In the wavelength conversion element, the portion of the substrate and the wavelength conversion layer has the function of diffusing the first color light, thereby reducing a difference between a divergence angle of the first color light (the unabsorbed portion) and a divergence angle of the second color light upon being outputted from the wavelength conversion element.

According to the light source device and the electronic apparatus of the embodiments of the present disclosure, the unabsorbed portion of the first color light and the second color light are outputted from the wavelength conversion element, and the illumination light is generated on the basis of the outputted light. In the wavelength conversion element, the portion of the substrate and the wavelength conversion layer has the function of diffusing the first color light, which makes it possible to reduce the difference between the divergence angle of the first color light and the divergence angle of the second color light to make angle distributions of the first color light and the second color light closer to each other. Thus, it is possible to achieve illumination light with less occurrence of color unevenness on an irradiated surface.

It is to be noted that the contents described above are merely examples of the present disclosure. Effects of the present disclosure are not necessarily limited to the effects described above, and may be or may further include any other effect.

MODES FOR CARRYING OUT THE INVENTION

In the following, embodiments of the present disclosure are described in detail with reference to the drawings. It is to be noted that description is made in the following order.
1. Embodiment (An example of a light source device in which a phosphor layer in a transmissive wavelength conversion element includes a diffusion material)
2. Modification Example 1 (An example having a diffusion configuration on a surface on a phosphor layer side of a substrate)
3. Modification Example 2 (An example in which the phosphor layer has a cavity)
4. Modification Example 3 (An example in which the substrate has a cavity)
5. Modification Example 4 (An example of a case using a transmissive/reflective wavelength conversion element)
6. Application Example (An example of a projection-type display device)

Embodiments

[Configuration]

Figure 1:
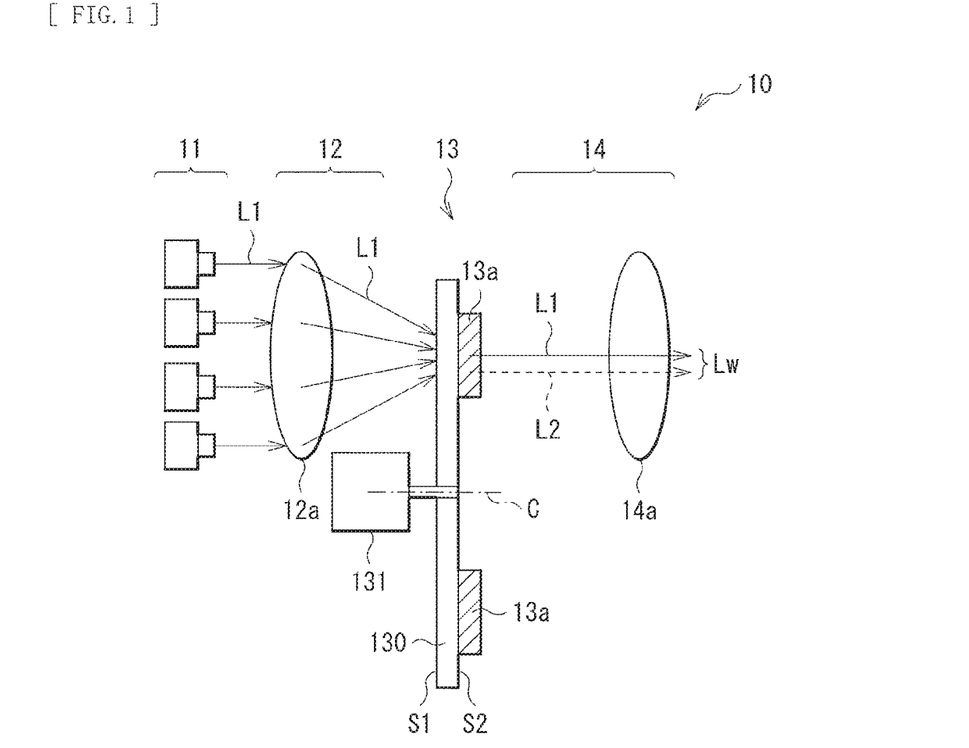
FIG. 1 is a schematic view of a configuration of a light source device according to an embodiment of the present disclosure.

FIG. 1 illustrates a configuration example of a light source device (light source device 10) according to an embodiment of the present disclosure. The light source device 10 is used as an illumination for an electronic apparatus such as a projection-type display device (projector) to be described later.

The light source device 10 emits, for example, white light Lw as illumination light and includes, for example, a light source unit 11, a condensing optical system 12, a wavelength conversion element 13, and a collimating optical system 14. The condensing optical system 12 and the collimating optical system 14 are disposed with the wavelength conversion element 13 in between. The light source device 10 emits the illumination light, for example, the white light Lw by mixing color light emitted from the light source unit 11 with fluorescence from the wavelength conversion element 13.

The light source unit 11 includes, for example, one or more laser diodes (LDs) (a plurality of LDs are schematically illustrated herein) and emits blue light L1, for example. The light L1 has an intensity peak in, for example, a blue wavelength range (for example, from 430 nm and to 480 nm both inclusive). The light source unit 11 is, for example, an excitation light source of the wavelength conversion element 13. It is to be noted that the light L1 according to the present embodiment corresponds to a specific example of "first color light" of the present disclosure. Moreover, although the description is given below assuming that the light L1 is blue light, light in another wavelength range may be used as the light L1 depending on properties of a phosphor layer 13a (phosphor particle 13a1) used in the wavelength conversion element 13. Furthermore, the light is not limited to light in a visible range but light in an invisible range such as an ultraviolet range may be used. It is to be noted that the phosphor layer 13a of the present embodiment corresponds to a specific example of a "wavelength conversion layer" of the present disclosure.

The condensing optical system 12 includes, for example, one or more lenses (one lens 12a is illustrated herein). The condensing optical system 12 is, for example, an optical system that is disposed between the light source unit 11 and the wavelength conversion element 13 and condenses the light L1 emitted from the light source unit 11 toward the wavelength conversion element.

The wavelength conversion element 13 has functions of absorbing a portion of the incident light L1 to output light (light L2) in a wavelength range different from that of the light L1, and outputting an unabsorbed portion (a portion of which a wavelength is not converted) of the light L1. It is desirable that the wavelength conversion element 13 have, for example, a so-called transmissive phosphor wheel, which easily achieves downsizing and enhances light use efficiency. The wavelength conversion element 13 according to the present embodiment has a transmissive configuration. That is, the wavelength conversion element 13 outputs the unabsorbed portion of the light L1 serving as excitation light while allowing the unabsorbed portion to pass therethrough, and an output direction of the light L1 and an output direction of the light L2 serving as the fluorescence are coincident with each other.

The light L2 is, for example, yellow light having an intensity peak in a wavelength range (from 480 nm to 700 nm both inclusive) including a green wavelength range and a red wavelength range. The light L2 may be regarded to be emitted as fluorescence from the surface of the wavelength conversion element 13 (phosphor layer 13a) or to be emitted from the surface. It is to be noted that the light L2 of the present embodiment corresponds to a specific example of "second color light" of the present disclosure. Moreover, although the description is given below assuming that the light L2 is yellow light, the light L2 may be light in another wavelength range depending on the wavelength range of the light L1 and the properties of the phosphor used in the wavelength conversion element 13. A combination resulting in, for example, the white light Lw by color mixture (color synthesis) may be selected depending on a type of the LD used for the light source unit 11 and the properties of the phosphor layer 13a in the wavelength conversion element 13.

The wavelength conversion element 13 includes, for example, a substrate 130, the phosphor layer 13a retained on or in the substrate 130, and a motor 131 (drive unit) that rotationally drives the substrate 130 around an axis C. The substrate 130 has a pair of surfaces (a surface S1 on an incidence side and a surface S2 on an output side), and the phosphor layer 13a is disposed on the surface S2 on the output side of the substrate 130, for example.

The substrate 130 has transmittivity to the light L1, for example, and configures a rotation body (wheel) having a disk shape, for example. It is desirable to use sapphire, etc., for example, as the substrate 130 to dissipate heat generated during fluorescence emission. The phosphor layer 13a is disposed along one circumference in a plane of the substrate 130 (in an annular region), for example. A portion of the phosphor layer 13a is configured to be disposed on an optical axis in a time division manner by rotation of the substrate 130. The phosphor layer 13a includes a material that emits the light L2 as fluorescence using the light L1 as excitation light (phosphor particle 13a1 to be described later). The phosphor layer 13a may be formed, for example, on the substrate 130 by coating. It is to be noted that the wavelength conversion element 13 may be provided with an unillustrated cooling mechanism. Moreover, the substrate 130 may be subjected to dichroic coating for efficient use of the fluorescence.

Although a configuration in which the wavelength conversion element 13 includes the phosphor wheel, that is, a configuration in which the phosphor layer 13a disposed on the substrate 130 is rotatable is described here as an example, it is to be noted that the phosphor layer 13a may not rotate depending on excitation energy or the like of the phosphor layer 13a.

The collimating optical system 14 is an optical system disposed on the light output side of the wavelength conversion element 13. The collimating optical system 14 is an optical system that parallelizes incident light, and includes one or more lenses, for example. It is to be noted that, for example, in a case where the light source device 10 is used for the projection-type display device (projector), or the like, the collimating optical system 14 is disposed on the light output side of the wavelength conversion element 13, but another optical system (an optical system other than the collimating optical system 14) may be disposed depending on the application of the light source device 10.

In the wavelength conversion element 13 of the light source device 10, a portion of the substrate 130 and the phosphor layer 13a has a diffusion function of the light L1 (function of diffusing the light L1). In the present embodiment, the phosphor layer 13a of the wavelength conversion element 13 has the diffusion function.

Figure 2:
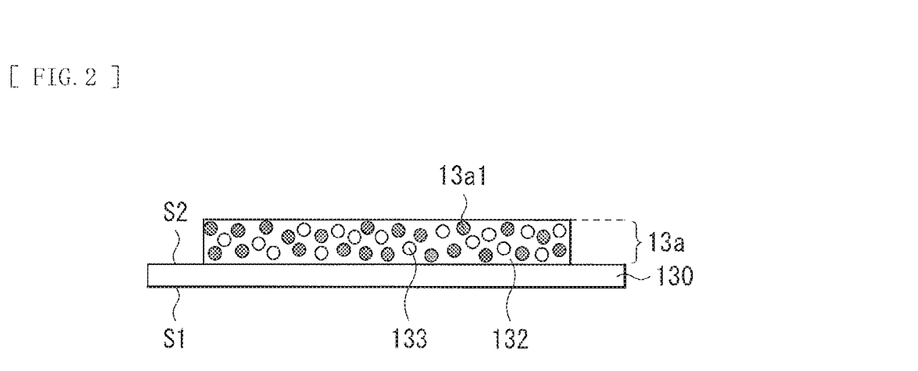
FIG. 2 is a schematic view of a main-part configuration of the wavelength conversion element illustrated in FIG. 1.

FIG. 2 schematically illustrates a main part configuration of the wavelength conversion element 13. The phosphor layer 13a includes phosphor particles 13a1 on the surface S2 of the substrate 130, for example. The phosphor particles 13a1 are retained by (enclosed in) a binder 132 while being dispersed in the binder 132 (in a dispersed state). The phosphor particles 13a emit the light L2 (yellow light) as fluorescence using the light L1 (for example, blue light) as excitation light. The binder 132 includes, for example, a resin used to enclose the phosphor particles 13a1. In the present embodiment, the phosphor layer 13a further includes a diffusion material 133 that diffuses and reflects the light L1. The diffusion material 133 is retained by the binder 132 along with the phosphor particles 13a while being dispersed. The diffusion material 133 may have a granular shape, for example, with a particle size equal to that of the phosphor particle 13a1 as illustrated in the drawing. The material, the density (concentration), the particle size, and the like of the diffusion material 133 may be set in, for example, but not limited to, the following manner. That is, the material, the density (concentration), the particle size, and the like of the diffusion material 133 may be set so that the diffusion angle of the light L1 outputted from the wavelength conversion element 13 is desirably 20 degrees or more, and more desirably 50 degrees or more.

[Workings and Effects]

In the light source device 10 according to the present embodiment, for example, in a case where the blue light L1 is emitted from the light source unit 11, the light L1 enters the condensing optical system 12, as illustrated in FIG. 1. The light L1 is condensed toward the wavelength conversion element 13 by the condensing optical system 12 to be focused near or inside the phosphor layer 13a with a predetermined spot diameter. In the wavelength conversion element 13, for example, the substrate 130 is rotationally driven by the motor 131, thereby disposing a portion of the phosphor layer 13a retained by the substrate 130 on the optical axis in a time division manner (in a cyclic manner). In a case where the light L1 enters the phosphor layer 13a, a portion of the light L1 is absorbed to emit the light L2 as fluorescence, and the light L2 is outputted from the wavelength conversion element 13. In contrast, a portion that are not absorbed by the phosphor layer 13a (unabsorbed portion) of the light L1 passes therethrough without being subjected to wavelength conversion, and is outputted from the wavelength conversion element 13 in the same direction as the light L2. In this manner, the wavelength conversion element 13 outputs the light L1 serving as the excitation light and the light L2 serving as the fluorescence on the same optical path.

The light L1 and the light L2 outputted from the wavelength conversion element 13 enter the collimating optical system 14, and is converted into parallel light by the collimating optical system 14. The white light Lw as the illumination light is outputted by color mixture of the light L1 and the light L2.

Here, in the wavelength conversion element 13, while a portion of the incident light L1 is absorbed by the phosphor particle 13a1, the other portion of the light L1 passes through a gap between the phosphor particles 13a1 in the phosphor layer 13a or is reflected by surfaces of the phosphor particles 13a1, thereby passing through and being outputted from the phosphor layer 13a without being subjected to wavelength conversion.

Figure 3:
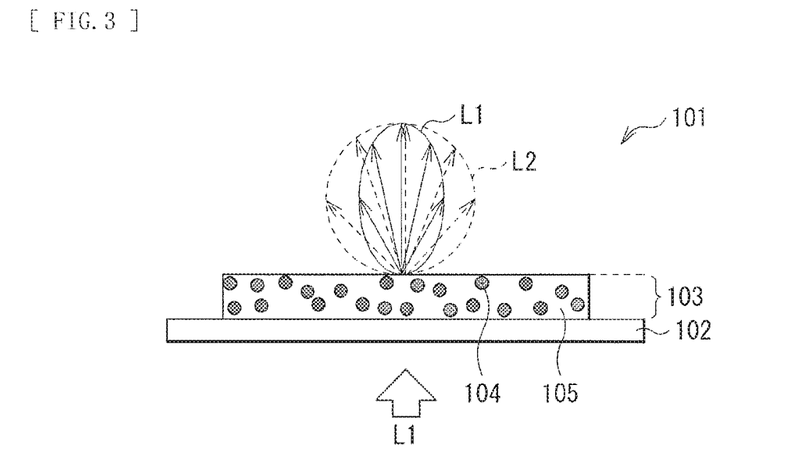
FIG. 3 is a schematic view for description of a main-part configuration of a wavelength conversion element according to a comparison example and its workings.

FIG. 3 illustrates a main part configuration of a wavelength conversion element (wavelength conversion element 101) according to a comparison example of the present embodiment. The wavelength conversion element 101 according to the comparison example includes a phosphor layer 103 formed on a substrate 102, and the phosphor layer 103 includes phosphor particles 104 and a binder 105. In the wavelength conversion element 101, a portion of the light L1 having entered the phosphor layer 103 is absorbed by the phosphor particles 104 to be outputted as the light L2, and the light L1 that is not absorbed by the phosphor particle 104 is outputted without being subjected to wavelength conversion (as the light L1).

The light L2 serving as the fluorescence of the light L1 and the light L2 is outputted from the surface of the phosphor layer 13a toward substantially all directions like so-called Lambertian diffusion (Lambertian reflection). That is, a divergence angle of the light L2 is large (a dashed line illustrated in FIG. 3). In contrast, the light L1 is diffusely reflected on the surfaces of the phosphor particles 13a1 in the process of passing through the phosphor layer 13a; therefore, the light L1 has a certain degree of the divergence angle, but the divergence angle is smaller than that of Lambertian light (a solid line illustrated in FIG. 3). Thus, the light L1 and the light L2 are different in light flux diameter condensed by the collimating optical system 14 after output, which causes luminance distributions and angle distributions of the light L1 and the light L2 on an irradiated surface (for example, a panel surface to be described later, etc.) to be different. This causes color unevenness in the irradiated surface. For example, in a case where the light source device 10 is used for the projection-type display device to be described later, the light having passed through a panel and a projection lens causes so-called vignetting in a projection optical system. In a case where the angle distributions of the light L1 and the light L2 on the panel surface are different as described above, vignetting is also different, resulting in the color unevenness on a screen. In this manner, the panel (light valve) or the screen is irradiated with illumination light (or light based on the illumination light), but the color unevenness occurs on the irradiated surface thereof. It is to be noted that the "irradiated surface" with the illumination light herein corresponds to, for example, a panel surface, a projection surface of the screen, etc.

Hence, there is considerable a technique of increasing the divergence angle of the excitation light by, for example, spatially dividing a region in a plane of the phosphor wheel, that is, providing a portion having a phosphor and a portion allowing the excitation light to pass therethrough while being diffused, and causing light to be outputted from the respective portions in a time division manner. However, this technique is applicable to a single-CCD display system using a panel operating at high speed such as a DLP (Digital Light Processing), but it is difficult to apply the technique to a three-CCD system. Moreover, for example, a technique of providing a diffuse reflective surface for excitation light on a surface of a phosphor layer in a reflective phosphor wheel is also considerable. This technique uses a polarizer for separation and multiplex of the excitation light and the fluorescence. However, polarized light is disturbed in a case where the polarized light passes through the phosphor layer, and the polarized light passes through the polarizer in such a disturbed state, which lowers the light use efficiency as the entire device. Alternatively, there is a technique of controlling the divergence angle of the excitation light by separating optical paths for the excitation light and the fluorescence and providing a diffusion surface having a large divergence angle on the optical path for the excitation light, but in this technique, an optical system becomes large, and cost is increased. Accordingly, it is desired to achieve a technique different from these techniques.

Figure 4:
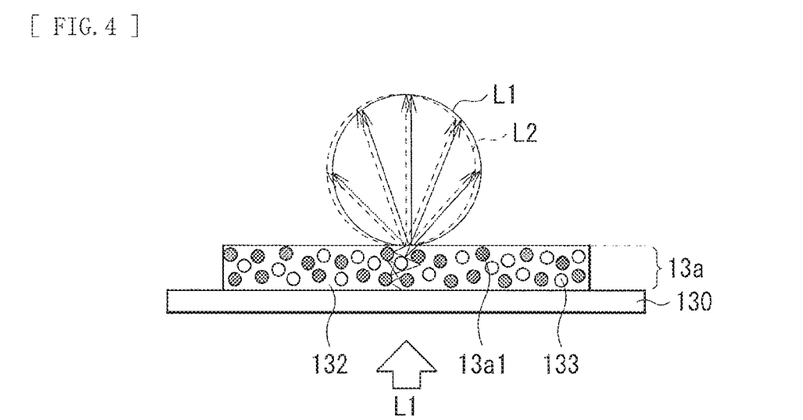
FIG. 4 is a schematic view for description of a main-part configuration of the wavelength conversion element illustrated in FIG. 1 and its workings.

In the present embodiment, the phosphor layer 13a of the wavelength conversion element 13 has the function of diffusing the light L1 (includes the diffusion material 133). This causes the light L1 not absorbed by the phosphor particles 13a1 to pass through the phosphor layer 13a while being reflected by the phosphor particles 13a1 and the diffusion material 133 and be outputted from the phosphor layer 13a. This makes it possible to increase the divergence angle of the light L1. As a result, a difference between the divergence angle of the light L1 and the divergence angle of the light L2 upon being outputted from the wavelength conversion element 13 is reduced. Desirably, as schematically illustrated in FIG. 4, the light L1 is outputted with the divergence angle close to Lambertian diffusion, i.e. the divergence angles of the light L1 and the light L2 are equal (substantially matched). This makes the angle distributions and the light flux diameters of the light L1 and the light L2 outputted from the collimating optical system 14 substantially equal.

Figure 5A:
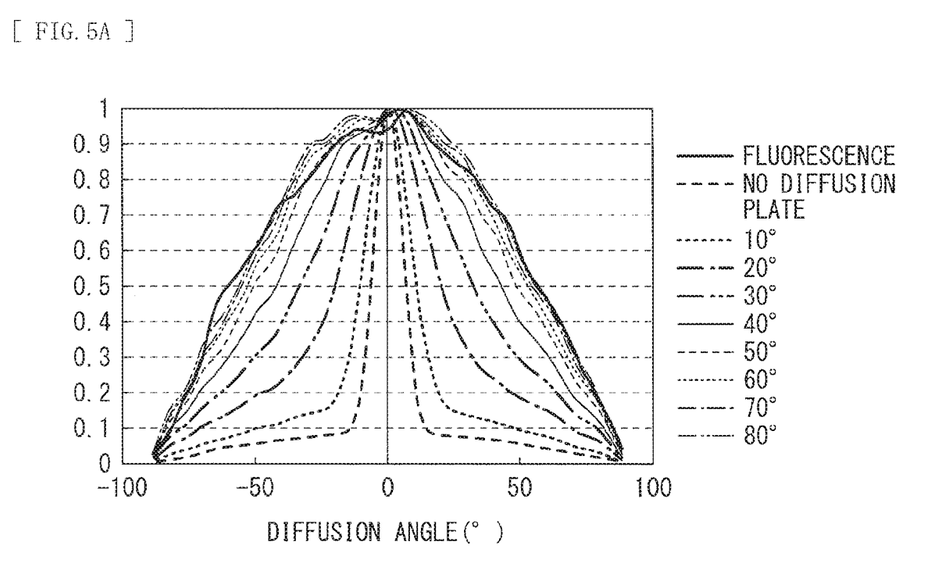
FIG. 5A is a characteristic diagram illustrating an angle distribution of emitted light in a case where a diffusion angle of a diffusion plate is varied.

Here, FIG. 5A illustrates the divergence angle (angle distribution) of the light L1 (blue light) and the divergence angle (angle distribution) of the light L2 (fluorescence). Specifically, FIG. 5A illustrates respective angle distributions (emission intensity with respect to the angle) in a case of using no diffusion material, cases of using the diffusion material (cases where the diffusion angle is 10 degrees, 20 degrees, 30 degrees, 40 degrees, 50 degrees, 60 degrees, 70 degrees, and 80 degrees), and a case of fluorescence emission. It is to be noted that the intensity of light outputted in a direction perpendicular to an output surface (front direction) is indicated at a diffusion angle of 0°, and the intensity of light emitted in a direction parallel to the output surface is indicated at diffusion angles of +90° and −90°.

Figure 5B:
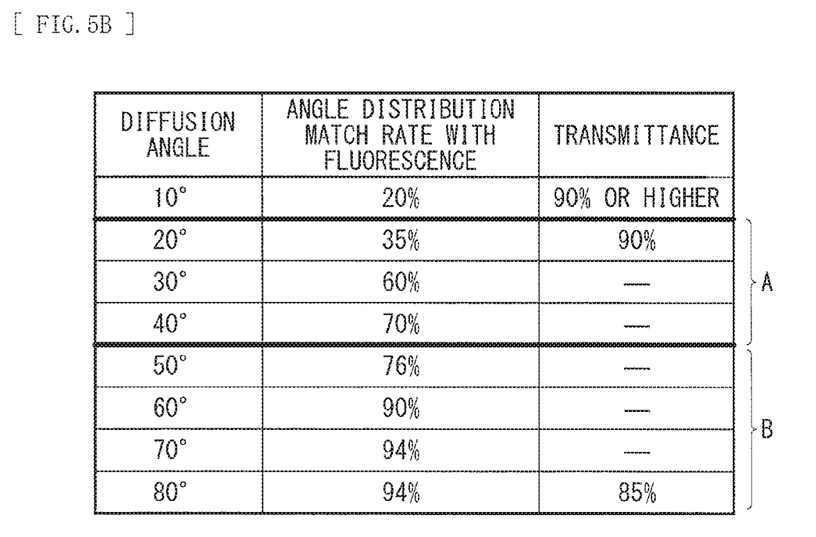
FIG. 5B is a chart illustrating an angle distribution match rate and transmittance of fluorescence with respect to the diffusion angle illustrated in FIG. 5A.

Moreover, FIG. 5B illustrates a match rate between the angle distribution of the light L1 and the angle distribution of the fluorescence (light L2), and the transmittance at each diffusion angle. The larger the diffusion angle is set, the closer the angle distributions of the light L1 and the light L2 may become to each other, while the transmittance (light use efficiency) tends to be reduced. Accordingly, it is desirable to set the diffusion angle in accordance with balance with the light use efficiency. For example, an effect of suppressing the color unevenness is achievable by setting the diffusion angle to be 20 degrees or more (ranges A and B in FIG. 5B). However, in a case where the light use efficiency is specifically emphasized, the diffusion angle is desirably set within a range from 20 degrees 50 degrees both inclusive (range A), and in a case where suppression of the color unevenness is specifically emphasized, the diffusion angle is desirably set to 50 degrees or more (range B). The diffusion angle is adjustable in the present embodiment by appropriately setting the material, the density, the particle size, and the like of the diffusion material 133 in the phosphor layer 13a.

Figure 6A:
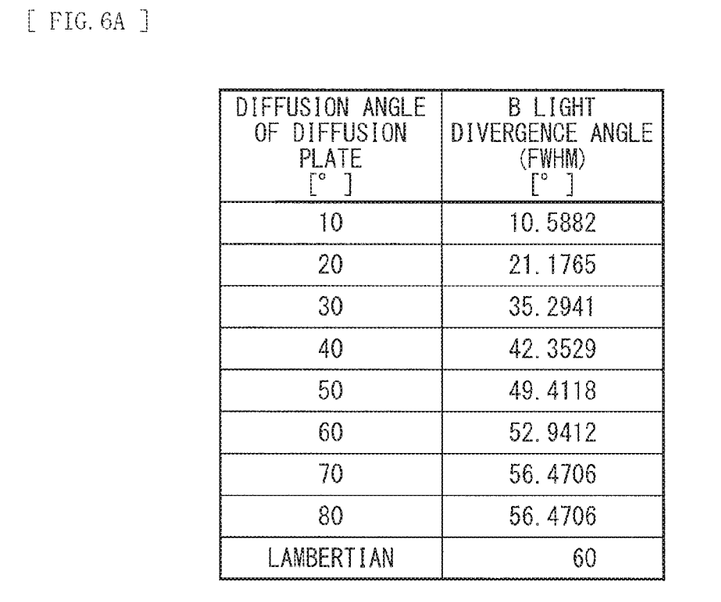
FIG. 6A is a chart illustrating a divergence angle from the light source device with respect to the diffusion angle of the diffusion plate.
Figure 6B:
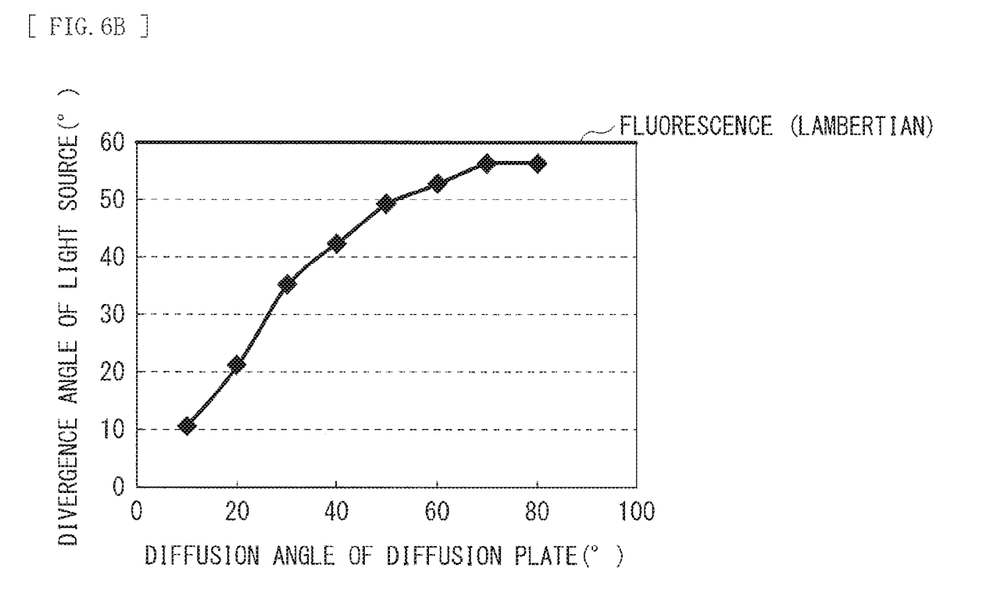
FIG. 6B is a graph plotting the divergence angle with respect to the diffusion angle illustrated in FIG. 6A.

It is to be noted that the diffusion angle is a half value of central intensity of the light outputted from the diffusion plate expressed as an angle. It is also to be noted that the divergence angle is a FWHM (full-width at half-maximum). FIG. 6A illustrates the divergence angle of the light L1 (blue light) with respect to the diffusion angle of the diffusion plate along with the case of the fluorescence (Lambertian). Moreover, FIG. 6B illustrates plotting of the respective values in FIG. 6A.

Moreover, the present embodiment is applicable not only to the single-CCD display system but also to a three-CCD display system.

Furthermore, the wavelength conversion element 13 is of the transmissive type; therefore, no polarizer for separation and multiplexing of the excitation light and the fluorescence is necessary, unlike a case of using a reflective wheel. Thus, unlike a reflective configuration, reduction of the light use efficiency due to the polarizer as described above may not occur. In the present embodiment, after the polarized light is disturbed, it is possible to align the polarized light by using a PS converter in, for example, an integrator optical system, etc.

In addition, the technique of separating optical paths for the excitation light (L1) and the fluorescence (L2) and providing a diffusion surface having a large divergence angle dedicated to the optical path for the excitation light has a concern about increased size and cost of the device. However, in the present embodiment, it is possible to make the optical paths for the excitation light and the fluorescence coincident, which make it possible to minimize the number of components and to reduce the size and cost of the device.

Moreover, the divergence angles of the light L1 and the light L2 are substantially coincident, which causes the angle distributions and the light flux diameters of the light L1 and the light L2 entering the optical system after being outputted from the wavelength conversion element 13 to be coincident. This makes it possible to design equal illumination efficiencies of the light L1 and the light L2 in an integrator optical system, for example. Here, in a case where the light flux diameters of the light L1 and the light L2 are not coincident, design is made to comply with either one of the light flux diameters, which causes reduction in one of the efficiencies. However, in the present embodiment, it is possible to suppress such reduction in the efficiency.

As described above, in the present embodiment, a portion of the light L1 having entered the wavelength conversion element 13 is converted into the light L2 by the phosphor layer 13a to be outputted, and the other unabsorbed portion is outputted without being subjected to wavelength conversion. That is, the light outputted from the wavelength conversion element 13 includes the light L1 and the light L2, and the illumination light is outputted on the basis of the outputted light. In the wavelength conversion element 13, the phosphor layer 13a has the function of diffusing the light L1 (includes the diffusion material 133), which allows the unabsorbed portion of the light L1 to pass through the phosphor layer 13a while being reflected by the phosphor particles 13a1 and the diffusion material 133 and be outputted from the phosphor layer 13a. This makes it possible to reduce a difference between the divergence angle of the light L1 and the divergence angle of the light L2 outputted from the wavelength conversion element 13 to make the angle distributions of the light L1 and the light L2 closer to each other. Thus, it is possible to achieve the illumination light with less occurrence of color unevenness on the irradiated surface.

Moreover, this allows angle distributions in a portion (peripheral portion) where a light quantity is reduced by the projection lens to be substantially coincident in the projection-type display device to be described later, for example. Thus, the degrees of reduction of peripheral light quantities of the light L1 and the light L2 are equal, and the luminance distributions of the light L1 and the light L2 on the projection surface are consequently equal, which makes it possible to suppress occurrence of the color unevenness.

Next, modification examples of the above-described embodiment are described. Hereinbelow, components similar to those in the above-described embodiment are denoted by same reference numerals, and description thereof is omitted as appropriate.

Modification Example 1

Figure 7:
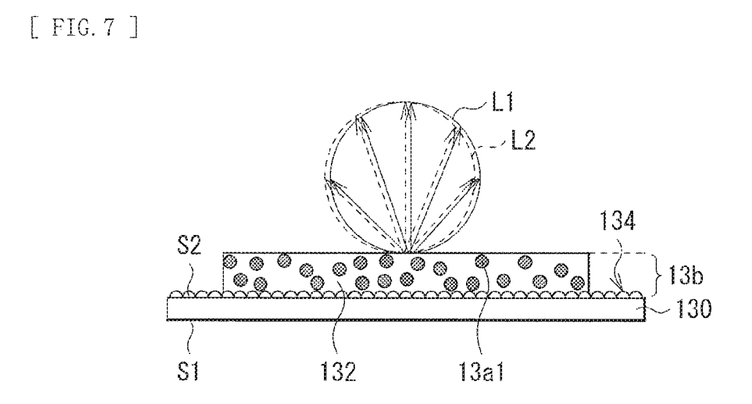
FIG. 7 is a schematic view of a main-part configuration of a wavelength conversion element according to a modification example 1 and its workings.

FIG. 7 illustrates a main part configuration of a wavelength conversion element according to a modification example 1. Although the above-described embodiment involves an example in which the phosphor layer 13a of the wavelength conversion element has the function of diffusing the light L1 (includes the diffusion material 133), the substrate 130 may have the function of diffusing the light L1 as in the present modification example. In the present modification example, for example, a diffusion structure 134 is provided on a side on which the surface S2 is located of the substrate 130 (the surface S2 of the substrate 130 is configured to diffuse the light L1). A phosphor layer 13b is formed on the surface S2 of the substrate 130 with the diffusion structure 134 in between. The phosphor layer 13b includes, for example, the phosphor particles 13a1 and the binder 132.

The diffusion structure 134 includes, for example, a plurality of macrolenses (a plurality of microlenses are formed on the surface S2 of the substrate 130). Alternatively, the diffusion structure 134 may have a concavo-convex shape formed on the side on which the surface S2 is located of the substrate 130. It is possible to form the concavo-convex shape by performing, for example, blasting, etching, etc. on the surface S2 of the substrate 130. It is to be noted that, although the diffusion structure 134 is disposed on the side on which the surface S2 is located of the substrate 130 herein, such a diffusion structure 134 may be disposed on a side on which the surface S1 is located of the substrate 130 or may be disposed on both the sides on which the surfaces S1 and S2 are located. However, it is desirable to dispose the diffusion structure 134 on the side on which the surface S2 is located of the substrate 130 as in the present modification example, which makes it possible to reduce optical loss, as compared with a case where the diffusion structure 134 is disposed on the side on which the surface S1 is located.

The diffusion structure 134 for the light L1 may be provided on one surface of the substrate 130 as in the present modification example, and even in this case, it is possible to allow the light L1 entering the wavelength conversion element to pass therethrough while being diffusely reflected, as in the above-described embodiment. This makes it possible to reduce the difference between the divergence angles of the light L1 and the light L2 outputted from the phosphor layer 13b to make the respective angle distributions closer to each other. Thus, it is possible to obtain the same effect as that of the above-described embodiment.

Modification Example 2

Figure 8:
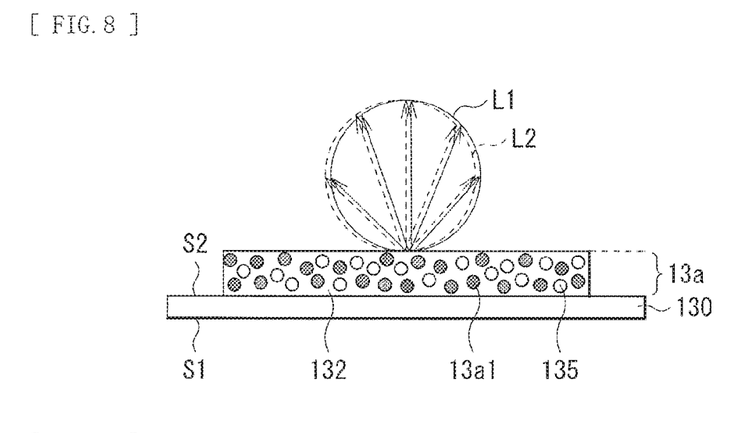
FIG. 8 is a schematic view of a main-part configuration of a wavelength conversion element according to a modification example 2 and its workings.

FIG. 8 illustrates a main part configuration of a wavelength conversion element according to a modification example 2. Although the above-described embodiment involves an example in which the phosphor layer 13a of the wavelength conversion element includes the diffusion material 133, cavities 135 may be dispersed in the phosphor layer 13a instead of the diffusion material 133, as in the present modification example. In the present modification example, the phosphor layer 13a is formed on the surface S2 of the substrate 130, and the phosphor layer 13a includes the phosphor particles 13a1 and the binder 132. The cavities 135 are dispersedly present inside the binder 132.

As in the present modification example, the phosphor layer 13a may have the diffusion function by including the cavities 135. Even in this case, it is possible to allow the light L1 entering the wavelength conversion element to pass therethrough while being reflected on the surfaces of the phosphor particle 13a1 and the cavities 135, as in the above-described embodiment. This makes it possible to reduce the difference between the divergence angles of the light L1 and the light L2 outputted from the phosphor layer 13b to make the respective angle distributions closer to each other. Thus, it is possible to obtain the same effect as that of the above-described embodiment.

Modification Example 3

Figure 9:
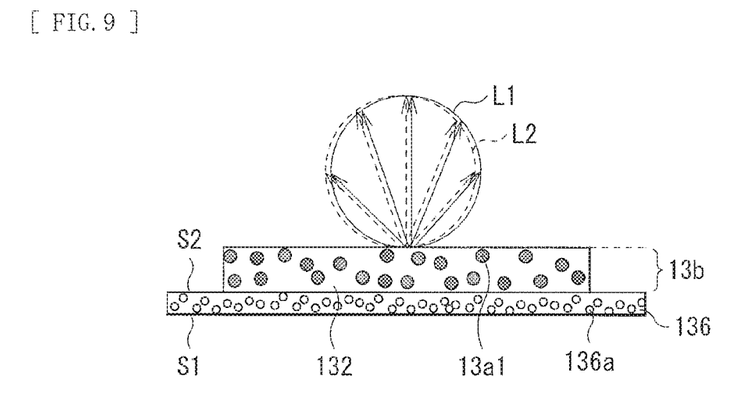
FIG. 9 is a schematic view of a main-part configuration of the wavelength conversion element according to a modification example 3 and its workings.

FIG. 9 illustrates a main part configuration of a wavelength conversion element according to a modification example 3. Although the above-described embodiment involves an example in which the phosphor layer 13a of the wavelength conversion element has the function of diffusing the light L1 (includes the diffusion material 133), the substrate (substrate 136) may have the function of diffusing the light L1 as in the present modification example. In the present modification example, for example, cavities 136a dispersed inside the substrate 136 (the cavities 136a may be dispersed inside the substrate 136). The phosphor layer 13b is formed on the surface S2 of the substrate 136 with the diffusion structure 134 in between. The phosphor layer 13b includes, for example, the phosphor particles 13a1 and the binder 132.

As in the present modification example, the substrate 136 may have the diffusion function by including the cavities 136a. Even in this case, it is possible to allow the light L1 entering the wavelength conversion element to pass therethrough while being reflected on the surfaces of the phosphor particles 13a1 and the cavities 136a, as in the above-described embodiment. This makes it possible to reduce the difference between the divergence angles of the light L1 and the light L2 outputted from the phosphor layer 13b to make the respective angle distributions closer to each other. Thus, it is possible to obtain the same effect as that of the above-described embodiment.

Modification Example 4

Figure 10:
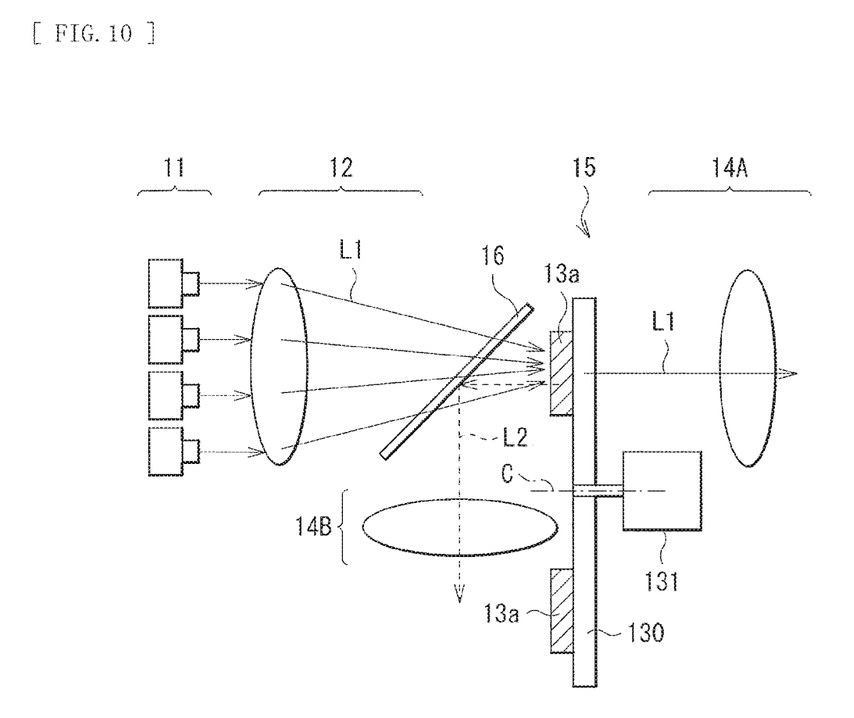
FIG. 10 is a schematic view of a configuration of a light source device according to a modification example 4.

FIG. 10 illustrates a configuration of a light source device according to a modification example 4. Although a configuration example using the transmissive wavelength conversion element 13 is described in the above-described embodiment, the present modification example employs a so-called transmissive/reflective wavelength conversion element (wavelength conversion element 15). In the present modification example, the condensing optical system 12 and the wavelength conversion element 15 are disposed in this order from a side on which the light source unit 11 is located. A wavelength separator 16 is disposed between the condensing optical system 12 and the wavelength conversion element 15. For example, in a case where the light L1 serving as the excitation light enters the wavelength conversion element 15, a portion of the light L1 is converted into the light L2 by the phosphor layer 13a and then reflected by a reflective surface, thereby being outputted to the same side as a side where the light L1 has entered. In contrast, the unabsorbed portion of the light L1 passes through the phosphor layer 13a and the substrate 130 of the wavelength conversion element 15 and then is outputted toward a direction opposite to the light L2. Collimating optical systems 14A and 14B are respectively disposed on optical paths of the light L1 and the light L2 outputted from the wavelength conversion element 15.

Next, description is given of a projector (projection-type display device) as an example of an electronic apparatus to which the light source device (light source device 10) according to any of the above-described embodiment and the like is applied. It is to be noted that the light source device according to any of the above-described embodiment and the like may be applied to various types of illumination devices that emits white light such as a headlamp (headlight) for automobile, in addition to the projection-type display device described below.

Application Example

Figure 11:
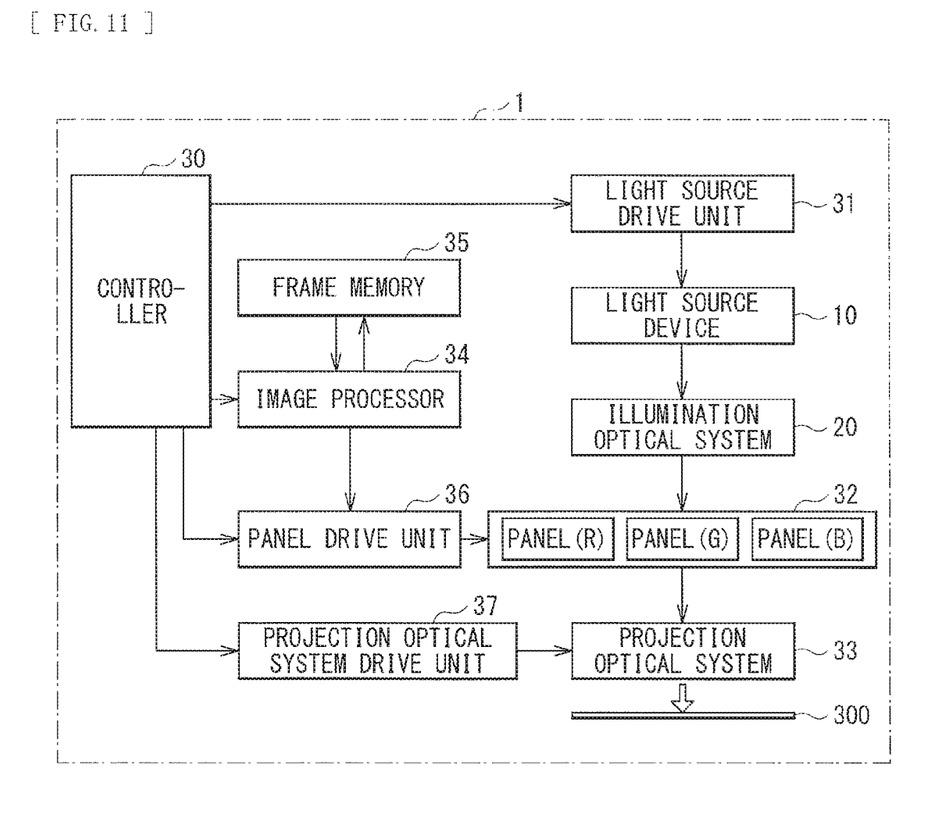
FIG. 11 is a functional block diagram illustrating a configuration of a projection-type display device according to an application example.

FIG. 11 is a functional block diagram illustrating an overall configuration of a projection-type display device (projection-type display device 1) according to an application example. The projection-type display device 1 is a display device that projects an image onto a screen 300 (projection surface), for example. The projection-type display device 1 is coupled, via an I/F (interface), to an unillustrated computer such as a PC or an unillustrated external image supplying device such as various types of image players, and performs projection onto the screen 300 on the basis of an image signal inputted to the interface.

The projection-type display device 1 includes, for example, a light source drive unit 31, the light source device 10, an illumination optical system 20, a light modulator 32, a projection optical system 33, an image processor 34, a frame memory 35, a panel drive unit 36, a projection optical system drive unit 37, and a controller 30.

The light source drive unit 31 outputs a pulse signal for control of emission timing of the light source unit 11 disposed in the light source device 10. The light source drive unit 31 includes, for example, an unillustrated PWM setter, an illustrated PWM signal generator, an illustrated limiter, etc. The light source drive unit 31 controls a light source driver of the light source device 10 on the basis of the control by the controller 30, and adjusts on/off and luminance of the light source unit 11 by performing, for example, PWM-control on the light source unit 11.

Although not specifically illustrated, the light source device 10 further includes, for example, the light source driver that drives the light source unit 11 and a current value setter that sets a current value upon driving the light source unit 11 in addition to the components described in the above-described embodiment. The light source driver generates a pulse current having the current value set by the current value setter in synchronization with the pulse signal inputted from the light source drive unit 31 on the basis of electric power supplied by an unillustrated power source circuit. The generated pulse current is supplied to the light source unit 11.

The illumination optical system 20 is an optical system that forms illumination light for each panel in the light modulator 32 on the basis of, for example, the light (white light Lw) emitted from the light source device 10, and includes, for example, a beam forming element, an integrator optical system, a color separator, etc.

The light modulator 32 modulates light (illumination light) outputted from the illumination optical system 20 on the basis of the image signal to generate image light. The light modulator 32 includes, for example, three transmissive or reflective light valves corresponding to respective color of RGB. Examples thereof include a liquid crystal panel that modulates blue light (B), a liquid crystal panel that modulates red light (R), and a liquid crystal panel that modulates green light (G). As the reflective liquid crystal panel, for example, a liquid crystal element such as an LCOS (Liquid Crystal On Silicon) may be used. However, not only the liquid crystal element but also other light modulation element such as a DMD (Digital Micromirror Device) may be used for the light modulator 32. Respective color light of RGB modulated by the light modulator 32 is combined by an unillustrated cross dichroic prism or the like, and is guided to the projection optical system 33.

The projection optical system 33 includes, for example, a lens group, etc. that is used to project the light modulated by the light modulator 32 onto the screen 300 to form an image.

The image processor 34 acquires the image signal inputted from the outside, and perform determination of an image size, determination of resolution, determination of a still image or a moving image, and so on. In a case of a moving image, an attribute of image data such as a frame rate is also determined. Moreover, in a case where the resolution of the acquired image signal is different from display resolution of each of the liquid crystal panels in the light modulator 32, resolution conversion is performed. The image processor 34 develops the image having been subjected to these respective processes for each frame in the frame memory 35, and outputs the image for each frame developed in the frame memory 35 to the panel drive unit 36 as a display signal.

The panel drive unit 36 drives each of the liquid crystal panels in the light modulator 32. Driving by the panel drive unit 36 changes the transmittance of light in each pixel disposed in each of the liquid crystal panels, thereby forming an image.

The projection optical system drive unit 37 includes a motor that drives a lens disposed in the projection optical system 33. The projection optical system drive unit 37 drives, for example, the projection optical system 33 in accordance with control by the controller 30 to perform zoom adjustment, focus adjustment, aperture adjustment, etc.

The controller 30 controls the light source drive unit 31, the image processor 34, the panel drive unit 36, and the projection optical system drive unit 37.

In the projection-type display device 1, the light having entered the projection optical system 33 is projected onto the screen 300 while falling off peripheral light rays, depending on an effective diameter of a lens disposed at a position excluding a lens pupil, and the like. At this time, the projection-type display device 1 includes the above-described light source device 10, which allows the divergence angles (angle distributions) of the light L1 and the light L2 emitted from the light source device 10 to be substantially coincident. This equalizes levels of reduction of the peripheral light quantity resulting from falling off as described above in the light L1 and the light L2. Thus, it is possible to suppress occurrence of color unevenness on the screen 300.

Although the present disclosure has been described above with reference to the embodiment and the modification example, the present disclosure is not limited thereto, and may be modified in a variety of ways. For example, the components of the optical system exemplified in the above-described embodiment and the like (for example, the light source, the condensing optical system, the wavelength conversion element, the collimating optical system, etc.) are merely examples, and all the components may not necessarily be included, or any other component may be further included. It is to be noted that the effects described in the description are illustrative and non-limiting, and other effects may be included.

Moreover, the present disclosure may have the following configurations.

(1)

A light source device, including a wavelength conversion element, the wavelength conversion element including:

a substrate; and a wavelength conversion layer that is retained by the substrate, and absorbs a portion of incident first color light to output second color light in a wavelength range different from the first color light while outputting an unabsorbed portion of the first color light, in which a portion of the substrate and the wavelength conversion layer has a function of diffusing the first color light.

(2)

The light source device according to (1), in which the wavelength conversion layer includes:

phosphor particles that absorb the first color light to emit the second color light as fluorescence, a binder that retains the phosphor particles therein in a dispersed state, and a diffusion material dispersed in the binder along with the phosphor particles.

(3)

The light source device according to (1) or (2), in which the wavelength conversion layer includes:

phosphor particles that absorb the first color light to emit the second color light as fluorescence, a binder that retains the phosphor particles therein in a dispersed state, and cavities dispersed in the binder along with the phosphor particles.

(4)

The light source device according to any one of (1) to (3), in which the substrate has a pair of surfaces facing each other, and one or both of the pair of surfaces are configured to diffuse the first color light.

(5)

The light source device according to (4), in which a plurality of microlenses are formed on one or both of the pair of surfaces.

(6)

The light source device according to (4) or (5), in which one or both of the pair of surfaces have a concavo-convex shape.

(7)

The light source device according to any one of (4) to (6), in which a surface on a side on which the wavelength conversion layer is located of the pair of surfaces of the substrate is configured to diffuse the first color light.

(8)

The light source device according to any one of (1) to (7), in which the substrate includes cavities dispersed in the substrate.

(9)

The light source device according to any one of (1) to (8), in which a diffusion angle of the first color light outputted from the wavelength conversion element is 20 degrees or more.

(10)

The light source device according to any one of (1) to (9), in which a diffusion angle of the first color light outputted from the wavelength conversion element is 50 degrees or more.

(11)

The light source device according to any one of (1) to (10), in which the unabsorbed portion of the first color light passes through the wavelength conversion element to be outputted, and the second color light is outputted in a same direction as the first color light.

(12)

The light source device according to any one of (1) to (11), in which the wavelength conversion element includes a drive unit that rotationally drives the substrate.

(13)

An electronic apparatus, provided with a light source device, the light source device including a wavelength conversion element, the wavelength conversion element including:

a substrate, and a wavelength conversion layer that is retained by the substrate, and absorbs a portion of incident first color light to output second color light in a wavelength range different from the first color light while outputting an unabsorbed portion of the first color light, in which a portion of the substrate and the wavelength conversion layer has a function of diffusing the first color light.

This application claims the priority of Japanese Patent Application No. 2016-69940 filed with the Japan Patent Office on Mar. 31, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A light source device, comprising:
   a wavelength conversion element, wherein the wavelength conversion element includes:
      a substrate that includes a first surface and a second surface opposite to the first surface,
      a wavelength conversion layer on a side of the second surface of the substrate, wherein the wavelength conversion layer is configured to:
         absorb a portion of a first color light incident on the first surface of the substrate;
         output, based on the absorbed portion of the first color light, a second color light in a wavelength range different from that of the first color light and
         output an unabsorbed portion of the first color light; and a diffusion structure on the second surface of the substrate, wherein
the diffusion structure is between the substrate and the wavelength conversion layer,
the diffusion structure includes a plurality of microlenses, and
the diffusion structure is configured to diffuse the first color light.

2. The light source device according to claim 1, wherein the wavelength conversion layer includes:
a plurality of phosphor particles that absorb the first color light to emit the second color light as fluorescence; and
a binder that retains the phosphor particles in a dispersed state.

3. The light source device according to claim 1, wherein each of the first surface and the second surface is configured to diffuse the first color light.

4. The light source device according to claim 3, wherein the plurality of microlenses is on both the first surface and the second surface.

5. The light source device according to claim 3, wherein each of the first surface and the second surface has a concavo-convex shape.

6. The light source device according to claim 3, wherein the second surface of the substrate is configured to diffuse the first color light.

7. The light source device according to claim 1, wherein a diffusion angle of the first color light outputted from the wavelength conversion element is one of 20 degrees or more.

8. The light source device according to claim 1, wherein a diffusion angle of the first color light outputted from the wavelength conversion element is one of 50 degrees or more.

9. The light source device according to claim 1, wherein the second color light is outputted in a direction same as the first color light.

10. The light source device according to claim 1, wherein the wavelength conversion element further includes a drive unit configured to rotationally drive the substrate.

11. An electronic apparatus, comprising:
a light source device, wherein
the light source device includes a wavelength conversion element, and
the wavelength conversion element includes:
a substrate that includes a first surface and a second surface opposite to the first surface;
a wavelength conversion layer on a side of the second surface of the substrate, wherein the wavelength conversion layer is configured to:
absorb a portion of a first color light incident on the first surface of the substrate;
output, based on the absorbed portion of the first color light, a second color light in a wavelength range different from that of the first color light; and
output an unabsorbed portion of the first color light; and
a diffusion structure on the second surface of the substrate, wherein
the diffusion structure is between the substrate and the wavelength conversion layer,
the diffusion structure includes a plurality of microlenses, and
the diffusion structure is configured to diffuse the first color light.

* * * * *